(12) United States Patent
Sun et al.

(10) Patent No.: US 10,135,221 B2
(45) Date of Patent: Nov. 20, 2018

(54) SPATIAL DIVISION MULTIPLEXED OPTICAL COMMUNICATION SYSTEMS AND AMPLIFIERS FOR THE SAME

(71) Applicant: Tyco Electronics Subsea Communications LLC, Eatontown, NJ (US)

(72) Inventors: Yu Sun, Lansdale, PA (US); Oleg Sinkin, Long Branch, NJ (US); Maxim A. Bolshtyansky, East Windsor, NJ (US); Alexei N. Pilipetskii, Colts Neck, NJ (US); Dmitri Foursa, Colts Neck, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 0 days.

(21) Appl. No.: 15/257,895

(22) Filed: Sep. 6, 2016

(65) Prior Publication Data
US 2018/0069370 A1 Mar. 8, 2018

(51) Int. Cl.
*H04J 14/02* (2006.01)
*H01S 3/23* (2006.01)
(Continued)

(52) U.S. Cl.
CPC ........ *H01S 3/2316* (2013.01); *H01S 3/09408* (2013.01); *H01S 3/094049* (2013.01);
(Continued)

(58) Field of Classification Search
CPC ............. H01S 3/2316; H01S 3/094049; H01S 3/09408; H04B 10/516; H04B 10/2581; H04B 10/2972; H04J 14/02; H04J 14/04
(Continued)

(56) References Cited

U.S. PATENT DOCUMENTS 5,241,414 A 8/1993 Giles et al.
6,008,934 A 12/1999 Fatehi et al.
(Continued)

FOREIGN PATENT DOCUMENTS

WO 2005094321 10/2005

OTHER PUBLICATIONS

Li et al; "Space-Division Multiplexing: The Next Frontier in Optical Communication"; Advances in Optics and Photonics, 6, pp. 413-487 (2014); doi: 10.1364/AOP.6.000413.
(Continued)

*Primary Examiner* — M. R. Sedighian

(57) ABSTRACT

Optical amplifier assembly for spatial division multiplexing (SDM) optical communication systems. Each optical amplifier assembly includes a single pump assembly configured for causing amplification of signals traveling on separate fiber paths in different directions. Each fiber path includes a plurality of spatial dimensions. The single pump assembly includes a plurality of pump sources to provide redundancy and the optical amplifier assembly further includes splitters for splitting outputs of the pump sources to amplifiers coupled to the different spatial dimensions. Different modulation formats may be used on the different spatial dimensions with different pump power being provided to each of the modulation formats. Amplifiers with complementary outputs may be coupled to average out gain deviations.

22 Claims, 5 Drawing Sheets

(51) Int. Cl.
*H04B 10/516* (2013.01)
*H01S 3/094* (2006.01)
*H04B 10/2581* (2013.01)
*H04B 10/297* (2013.01)
*H04J 14/04* (2006.01)

(52) U.S. Cl.
CPC ..... *H04B 10/2581* (2013.01); *H04B 10/2972* (2013.01); *H04B 10/516* (2013.01); *H04J 14/02* (2013.01); *H04J 14/04* (2013.01)

(58) Field of Classification Search
USPC .... 398/79, 92, 62, 64, 67, 72, 97, 143, 144, 398/145, 157, 160
See application file for complete search history.

(56) References Cited

U.S. PATENT DOCUMENTS

| | | | |
|---|---|---|---|
| 6,381,065 | B1 | 4/2002 | Homsey |
| 6,587,241 | B1 | 7/2003 | Saleh |
| 6,618,195 | B2 | 9/2003 | Shieh et al. |
| 6,934,077 | B2 | 8/2005 | Stephens |
| 6,980,576 | B2 | 12/2005 | Frolov et al. |
| 7,170,673 | B2 | 1/2007 | Motoshima et al. |
| 8,189,258 | B2 | 5/2012 | Rapp et al. |
| 8,755,112 | B2 | 6/2014 | Stampoulidis et al. |
| 9,503,197 | B2 | 11/2016 | Pilipetskii et al. |
| 2004/0042064 | A1* | 3/2004 | Shieh ................ H04B 10/2916 359/341.3 |
| 2007/0058984 | A1 | 3/2007 | Charlet et al. |
| 2007/0115539 | A1* | 5/2007 | Charlet ............. H04B 10/2918 359/341.32 |
| 2008/0204860 | A1* | 8/2008 | Rapp .................... H04B 10/291 359/341.3 |
| 2011/0274435 | A1 | 11/2011 | Fini et al. |
| 2013/0114130 | A1 | 5/2013 | Stampoulidis et al. |
| 2013/0209091 | A1* | 8/2013 | Mateosky ........ H04B 10/07953 398/26 |
| 2013/0209106 | A1 | 8/2013 | Mukasa |
| 2015/0085352 | A1 | 3/2015 | Ryf et al. |
| 2015/0171964 | A1* | 6/2015 | Rapp ...................... H04J 14/00 398/58 |
| 2015/0229438 | A1 | 8/2015 | Le Taillandier De Gabory et al. |
| 2015/0311975 | A1* | 10/2015 | Pelouch ........... H04B 10/07953 398/27 |
| 2016/0072587 | A1* | 3/2016 | Pilipetskii ........... H04B 10/564 398/79 |

OTHER PUBLICATIONS

Doran et al; "Minimising Total Energy Requirements in Amplified Links by Optimising Amplifier Spacing"; published Aug. 8, 2014; vol. 22, No. 16; Optics Express.

Peter M. Krummrich; "Optical Amplification for Capacity increase in Long Haul Transmission Systems by Spatial Multiplexing"; IEEE; 2001; pp. 585-586.

International Search Report dated Nov. 20, 2015 in connection with PCT Patent Application Serial No. PCT/US2015/048286.

Takahashi et al; First Demonstration of MC-EDFA-Repeatered SDM Transmission of 40×128-Gbit/s PDM-QPSK Signals per Core over 6,160-km 7-core MCF; ECOC Postdeadline Papers; 2012; OSA; Optics Express Jan. 14, 2013, p. 789.

Krummrich et al; "Spatial Multiplexing for High Capacity Transport"; Optical Fiber Technology; vol. 17, No. 5, Aug. 25, 2011; pp. 480-489.

International Search Report, Application No. PCT/IB2017/054844, International Filing Date, Aug. 8, 2017.

\* cited by examiner

SPATIAL DIVISION MULTIPLEXED OPTICAL COMMUNICATION SYSTEMS AND AMPLIFIERS FOR THE SAME

TECHNICAL FIELD

The present disclosure relates to optical communication systems, and more specifically, to spatial division multiplexed optical communication systems and amplifiers for the same.

BACKGROUND

In wavelength division multiplexing (WDM) optical communication systems a single optical fiber may be used to carry multiple optical signals. The multiple optical signals are multiplexed to form a multiplexed signal or WDM signal with each of the multiple signals being modulated on separate channels. Each channel may be at an associated wavelength that is separated from adjacent channels by a defined channel-spacing, e.g. according to a channel plan established by the International Telecommunications Union (ITU). The range of wavelengths that may be transmitted on the system is known as the system bandwidth. Systems may utilize their system bandwidth to carry a desired number of channels with desired modulation format and bit rate.

One example of a prior art WDM transmission system 100 is illustrated in FIG. 1. The illustrated WDM system 100 includes first 102 and second 104 transceivers, an optical cable 106, and optical amplifiers 108-1 . . . 108-n. The optical cable 106 includes at least one pair of optical fibers 110e, 110w and a power conductor 112 for carrying electrical power to components coupled to the cable 106.

The system 100 serves to transmit optical signals TX1, TX2, TX3 from the first transceiver 102 in an "east" direction over fiber 110e to the second transceiver 104, where they are reproduced as received signals RX1, RX2, RX3, respectively. The system 100 also serves to transmit optical signals TX4, TX5, TX6 from the second transceiver 104 in a "west" direction over the fiber 110w to the first transceiver 102, where they are reproduced as received signals RX4, RX5, RX6, respectively.

Each of the amplifiers 108-1 . . . 108-n includes an erbium doped fiber amplifier (EDFA) 114-1 . . . 114-n, respectively, coupled to the "east" direction fiber 110e and an EDFA 116-1 . . . 116-n, respectively, coupled to the "west" direction fiber 110w for amplifying WDM signals on the fibers 110e and 110w. As is known, a rare-earth doped optical amplifier, such as an EDFA, operates by passing an optical signal through a doped fiber segment, and "pumping" the segment with light from another source such as a laser. The pump source excites rare-earth atoms, e.g. erbium atoms in the case of an EDFA, in the doped segment, which then serve to amplify the optical signal passing through the EDFA.

Within each amplifier 108-1 . . . 108-n the EDFAs 114-1 . . . 114-n and 116-1 . . . 116-n, respectively, are pumped by a common optical pump unit (OPU) 118-1 . . . 118-n to cause amplification of the WDM signals passing through the EDFAs 114-1 . . . 114-n and 116-1 . . . 116-n on the optical fibers 110e, 110w. Each of the OPUs 118-1 . . . 118-n includes a plurality of pumps. In general, the outputs of the pumps are combined and then split to provide two or more pump outputs for each OPU 118-1 . . . 118-n. The output power at each output of the OPUs 118-1 . . . 118-n is thus a combination of the pump power provided by each of the plurality of pumps in the OPU 118-1 . . . 118-n. Advantageously, if one of the pumps in the OPU 118-1 . . . 118-n fails, pump power from the other pump(s) with in the OPU 118-1 . . . 118-n is still provided at the outputs of the OPU 118-1 . . . 118-n for pumping the EDFAs 114-1 . . . 114-n and 116-1 . . . 116-n, respectively. Use of a common OPU 118-1 . . . 118-n for the EDFAs 114-1 . . . 114-n and 116-1 . . . 116-n, respectively, in each amplifier 108-1 . . . 108-n thus provides redundancy of pump power for pumping the EDFAs 114-1 . . . 114-n and 116-1 . . . 116-n within each amplifier 108-1 . . . 108n.

One example of an OPU 118a is illustrated in FIG. 2. The illustrated OPU 118a includes three pumps 202, 204, 206, e.g. continuous wave lasers, a combiner 208 and a coupler 210. The outputs of first 202 and second 204 pumps are coupled as separate inputs to the combiner 208. The combiner 208 may, for example, be a polarization maintaining combiner. The combiner 208 combines the outputs of the first 202 and second 204 pumps to provide a combiner output. The combiner output is coupled as a first input the coupler 210, and the output of the pump 206 is coupled as a second input to the coupler 210. The coupler 210 may, for example, be a known 50/50 4-port coupler. The coupler 210 combines the combiner output and the output of the pump 206 and then splits the combined output onto two separate output paths 212, 214 as first and second outputs of the OPU 118a. Each of the pumps 202, 204, 206 is thus coupled to both the first and second outputs of the OPU 118a. This provides redundancy in the event of failure of one of the pumps 202, 204, 206, since if one or more of the pumps 202, 204, 206 fail, then each output of the OPU 118 includes pump power from the remaining pump(s) 202, 204, 206.

With reference again to FIG. 1, electrical power for driving the pumps within the OPUs 118-1 . . . 118-n is coupled to the OPU through the power conductor 112 in the cable 106. In the illustrated example, power feed equipment (PFE) 120 in the transceiver 102 supplies the electrical power to the power conductor 112. The system 100 may be described as a power-limited system since the maximum power $P_{max}$ that the PFE equipment 120 may deliver to the power conductor 112 is limited by length (determined by distance between the transceivers) and configuration (e.g., composition, diameter etc.) of the power conductor 112. Increasing the total power delivered to the power conductor 112 to more than $P_{max}$ jeopardizes the integrity of the power conductor 112 and/or the PFE 120. Since the system 100 is a power-limited system, the electrical power available for driving the pumps in the OPUs 118-1 . . . 118-n is limited, which limits the amount of total pump power that may be provided by the OPUs 118-1 . . . 118-n.

The limited electrical power available in power-limited systems has created significant challenges to increasing transmission capacity. For example, multi-level modulation techniques and coherent receivers have been used to increase transmission rates and decrease channel spacing, thereby increasing the spectral efficiency (SE) of each channel in a WDM system. While use of multi-level modulation formats may increase spectral efficiency and transmission capacity, such formats may require increased signal-to-noise ratio (SNR). Operating with high SNR requires high optical channel output power and high amplifier pump power, especially for wide system bandwidths. In some configurations, delivering the required high power levels may not be technically and/or economically possible in a power-limited system.

Another approach to increasing spectral efficiency is to implement spatial division multiplexing (SDM). In an SDM system, a multi-dimensional fiber, e.g. a multi-core or multi-mode fiber, may be used, and the WDM signal may be separated onto each of the dimensions of the fiber. For example, instead of transmitting a WDM signal on a single core fiber, in an SDM system the signal may be separated and transmitted on each of the cores of a multi-core fiber or each of the modes of a multi-mode fiber.

Unfortunately, in long-haul SDM systems each of the dimensions, e.g. cores, of the transmission fiber must be amplified. In contrast to a non-SDM system wherein an WDM signal is carried on a single optical fiber and each amplifier amplifies the entire system bandwidth on the fiber, amplifying each of the dimensions in an SDM system requires a separate optical amplifier for each dimension. The optical pump power required to pump each of the dimensions of a multi-dimensional fiber may not be available in a power-limited system.

BRIEF DESCRIPTION OF THE DRAWINGS

Reference should be made to the following detailed description which should be read in conjunction with the following figures, wherein like numerals represent like parts.

DETAILED DESCRIPTION

In general, the present disclosure relates to spatial division multiplexing (SDM) optical communication systems and optical amplifiers for SDM systems. Each optical amplifier assembly includes a first plurality of amplifiers coupled to first optical fiber path for amplifying signals transmitted in an east direction and a second plurality of optical amplifiers coupled to a second optical fiber path for amplifying signals transmitted in a west direction. Each of the first and second plurality of optical amplifiers is coupled to a different associated spatial dimension of the first and second optical fiber paths, respectively.

Each optical amplifier assembly includes a single pump assembly configured for pumping the first and second plurality of optical amplifiers for causing amplification of signals traveling in the east and west directions. The pump assembly includes a known optical pump unit (OPU) including a plurality of pumps for providing redundancy. The outputs of the OPU are coupled to one or more splitters that split the outputs of the OPU onto separate paths and each of the separate paths is coupled to an associated one of the first or second plurality of amplifiers for providing pump power to the first and second plurality of amplifiers.

Use of an OPU in the pump assembly allows the system to keep the electrical power delivered to the power conductor of the system below the maximum allowable power. An SDM optical transmission system consistent with the present disclosure can thus provide increased transmission capacity compared to the data capacity of a non-SDM optical transmission system while maintaining power consumption at or below that of the non-SDM optical transmission system for the same transmission distance, electrical power conductor configuration and power feed configuration. The pump assembly may be used in an SDM configuration wherein the first and second optical fiber paths are single multi-core fibers having an amplifier associated with each core, single multi-mode fibers having an amplifier associated with each mode, or a bundle of single core, single mode fibers having an amplifier associated with each fiber.

Figure 3:
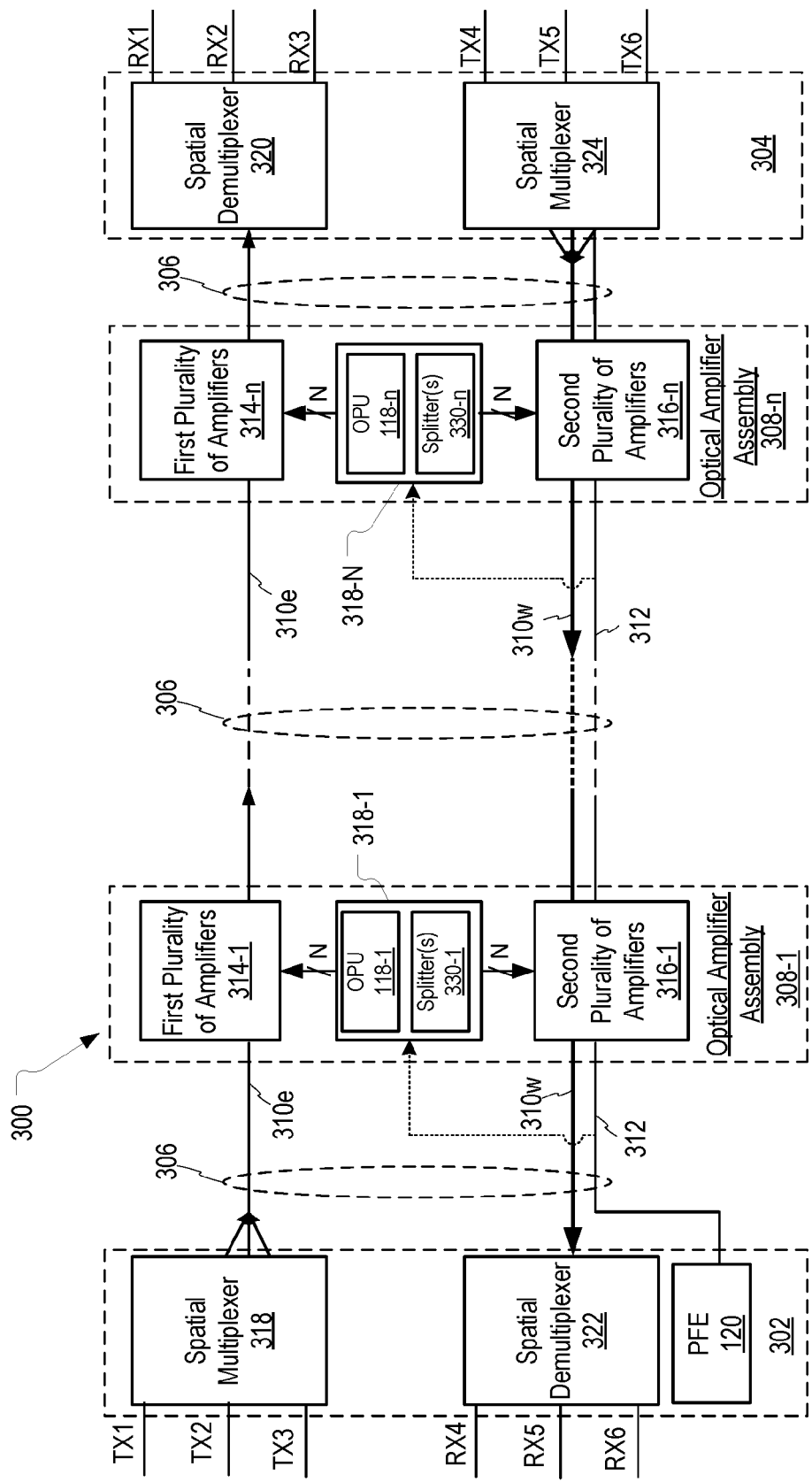
FIG. 3 is a block diagram of an example of a spatial-division multiplexing (SDM) optical transmission system consistent with the present disclosure.

One example of an SDM system 300 consistent with the present disclosure is diagrammatically illustrated in FIG. 3. The illustrated SDM system 300 includes first and second transceivers 302, 304, an optical cable 306, and optical amplifier assemblies 308-1 . . . 308-n. The optical cable 306 includes least first 310e and second 310w optical fiber paths. Each optical fiber path 310e, 310w includes a plurality of dimensions.

As used herein the term "dimension" refers to distinguishable optical data pathway. For example, a single mode and single core optical fiber has only one dimension. A multi-core fiber has a number of dimensions equal to the number of cores in the fiber, since each core can support an associated dimension. A multi-mode fiber or few-mode fiber has a number of dimensions equal to the modes supported by the fiber. A bundle of single mode, single-core fibers also has multiple dimensions, each of which is supported by a distinct one of the fibers. An SDM system consistent with the present disclosure may include any number of multi-dimensional optical fiber paths of any type.

The system 300 serves to transmit optical signals TX1, TX2, TX3 from the transceiver 302 in an east direction over optical fiber path 310e to the transceiver 304, where they are reproduced as received signals RX1, RX2, RX3, respectively. The system 300 also serves to transmit optical signals TX4, TX5, TX6 from the transceiver 304 in a west direction over the optical fiber path 310w to the transceiver 302, where they are reproduced as received signals RX4, RX5, RX6, respectively. Directionally relative terms "east" and "west" etc. may be used herein for ease of description to describe different directions of transmission along the optical fiber paths in an optical cable. These terms are not intended to refer to geographic directions, but instead simply indicate different directions of transmission.

In the illustrated embodiment, the spatial multiplexer 318 in the transceiver 302 may be configured to receive modulated optical signals TX1, TX2 and TX3 and multiplex the signals TX1, TX2 and TX3 onto the separate dimensions of the optical fiber path 310e. For a single multi-core fiber, for example, the spatial multiplexer 318 may provide the optical signals TX1, TX2 and TX3 on separate cores of the multi-core fiber, for a multi-mode or few-mode fiber the spatial multiplexer 318 may be configured to provide the optical signals TX1, TX2 and TX3 on the different modes of the multi-mode or few-mode fiber, and for an optical fiber path including a bundle of single mode, single core fibers the spatial multiplexer 318 may provide the optical signals TX1, TX2 and TX3 on separate fibers of the bundle of fibers. Similarly, the spatial multiplexer 324 in the transceiver 304 may be configured to receive modulated optical signals TX4, TX5 and TX6 and multiplex the signals TX4, TX5 and TX6 onto the separate dimensions of the optical fiber path 310w.

The optical amplifier assemblies 308-1 . . . 308n are coupled to optical cable 306 for amplifying the signals on the optical fibers paths 310e and 310w. The signals propagate within the optical fiber paths 310e and 310w, being amplified periodically along the way by the optical amplifier assemblies 308-1 . . . 308-n, until received by the spatial demultiplexers 320, 322, respectively. The spatial demultiplexer 320 reverses the multiplexing originally applied by the spatial multiplexer 318 to provide received signals RX1, RX2 and RX3 corresponding to the original signals TX1, TX2 and TX3, respectively. The spatial demultiplexer 322 reverses the multiplexing originally applied by the spatial multiplexer 324 to provide received signals RX4, RX5 and RX6 corresponding to the original signals TX4, TX5 and TX6, respectively.

The system 300 is shown as transmitting and receiving only three signals in each of the "east" and "west" directions for ease of illustration. Those of ordinary skill in the art will recognize that a WDM system can transmit a large number of signals on up to 128 or more optical channels. The exemplary system 100 may be a long-haul submarine system configured for transmitting the channels over a distance of 5,000 km, or more.

The optical cable 306 includes a power conductor 312 designed to convey electrical power to the optical amplifier assemblies 308-1 . . . 308n, optical add-drop-multiplexers, etc. coupled to optical cable 306. The configuration of the power conductor 312 may be common in undersea optical transmission systems where power must be carried along the run of optical cable 306. In the illustrated embodiment, power feed equipment (PFE) 120 in the transceiver 302 supplies the electrical power to the power conductor 312. The PFE 120 is shown as being located in the transceiver 302 for ease of illustration. Those of ordinary skill in the art will recognize that power feed equipment 302 may be located in either one, or both, of the transceivers 302, 304.

Figure 1:
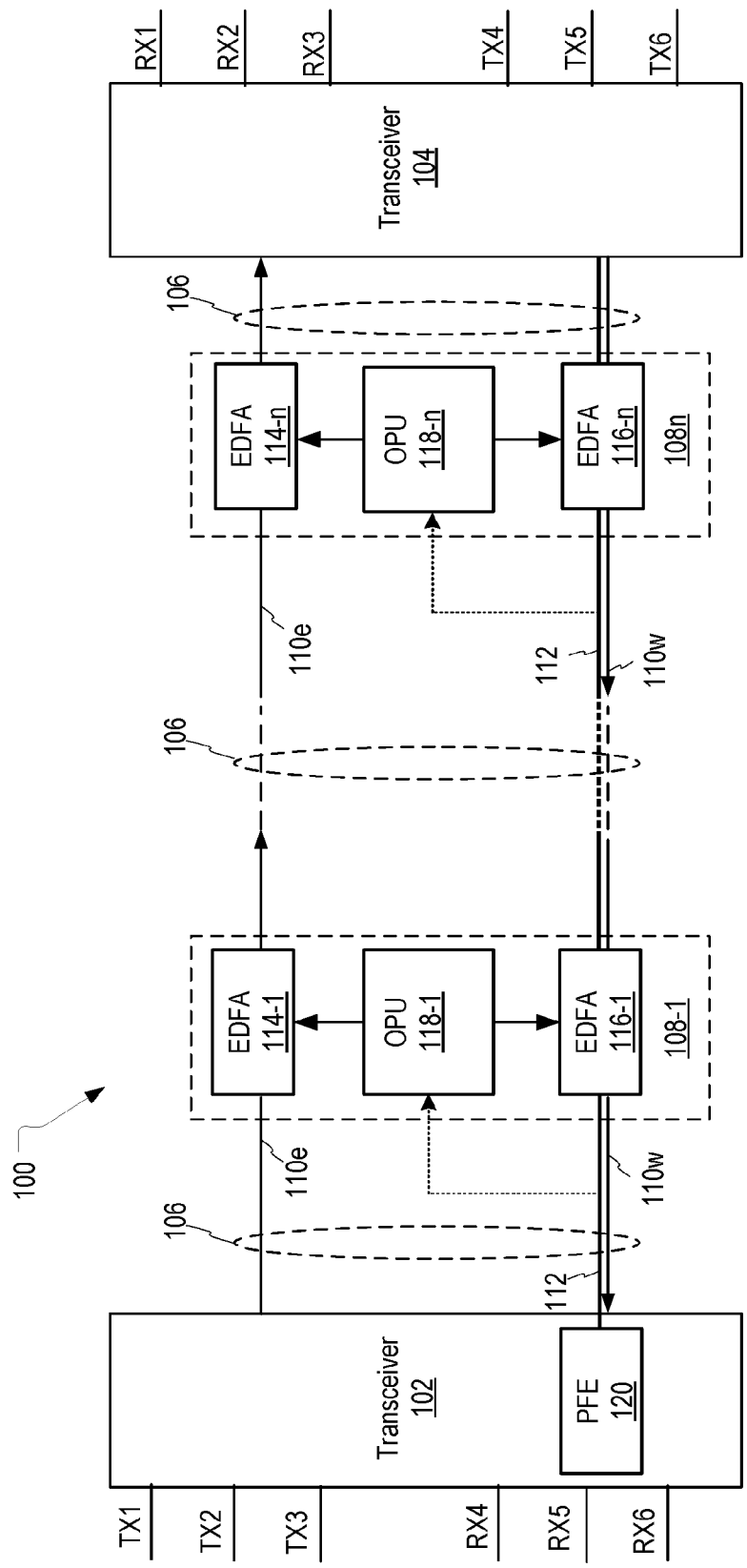
FIG. 1 is a block diagram of a prior art wavelength-division multiplexed (WDM) optical transmission system.

The system 300 is a power-limited system since the maximum power $P_{max}$ that the PFE equipment 120 may deliver to the power conductor 312 is limited by length (determined by distance between the transceivers) and configuration (e.g., composition, diameter etc.) of the power conductor 312. Increasing the total power delivered to the power conductor 312 to more than $P_{max}$ jeopardizes the integrity of the power conductor 312 and/or the PFE 120. The maximum power $P_{max}$ that the PFE equipment 120 can provide is independent of whether the system 300 is configured as an SDM system (as shown) or as a non-SDM system wherein a WDM signal is transmitted over a single core, single mode fiber as shown in FIG. 1.

Each of the amplifier assemblies 308-1 . . . 308-n includes a first plurality of optical amplifiers 314-1 . . . 314-n, respectively, coupled to the "east" direction optical fiber path 310e and a second plurality of optical amplifiers 316-1 . . . 316-n, respectively, coupled to the "west" direction optical fiber path 310w. Each optical amplifier within the first the 314-1 . . . 314-n and second 316-1 . . . 316-n plurality of optical amplifiers is coupled to a different associated dimension of the first 310e and second 310w optical fiber paths, respectively. Each optical amplifier within the first 314-1 . . . 314-n and second 316-1 . . . 316-n plurality of optical amplifier may be any type of known optical amplifier requiring one or more pump sources, e.g. any rare earth doped amplifier, a Raman amplifier and/or combinations thereof.

Figure 2:
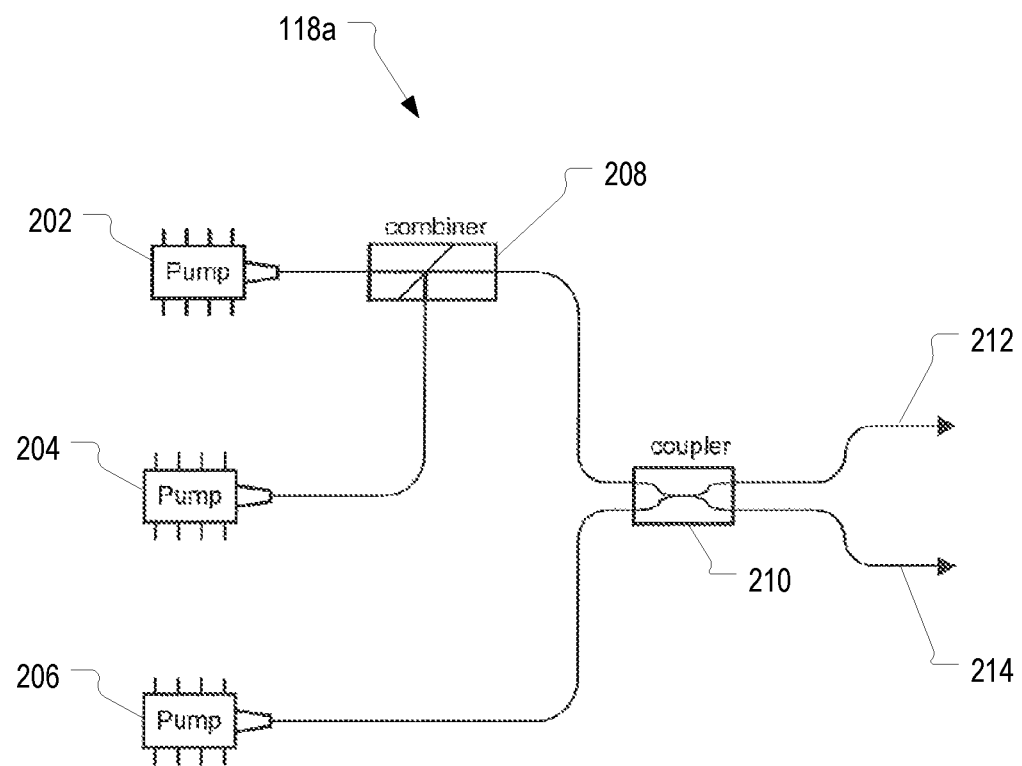
FIG. 2 is a block diagram of a prior art optical pump unit.

Within each amplifier assembly 308-1 . . . 308-n the first 314-1 . . . 314-n and second 316-1 . . . 316-n plurality of optical amplifiers, respectively, are pumped by a common pump assembly 318-1 . . . 318-n to cause amplification of the SDM signals passing through the first 314-1 . . . 314-n and second 316-1 . . . 316-n plurality of optical amplifiers on each dimension of the optical fiber paths 310e, 310w. Each pump assembly 318-1 . . . 318-n includes a known optical pump unit (OPU) 118-1 . . . 118-n, e.g. as described in connection with FIGS. 1 and 2, including a plurality of pumps for providing redundancy. The number of pumps in each OPU 118-1 . . . 118-n is less than the sum of the number of spatial dimensions in the first optical fiber 310e and the number of spatial dimensions in the second optical fiber 310w. In some embodiments the number of pumps each the OPU 118-1 . . . 118-n is less than the number of spatial dimensions in either the first 310e or second 310w optical fibers.

The outputs of each OPU 118-1 . . . 118-n are coupled to one or more splitter(s) 330-1 . . . 330-n that split the outputs of the OPU 118-1 . . . 118-n onto N separate paths and each of the N separate paths is coupled to an associated one of the first 314-1 . . . 314-n or second 316-1 . . . 316-n plurality of amplifiers for providing pump power to the first 314-1 . . . 314-n and second 316-1 . . . 316-n plurality of amplifiers. With this configuration, the amplifiers within the first 314-1 . . . 314-n and second 316-1 . . . 316-n plurality of amplifiers do not each require a separate pump. Instead, the number of pumps within the OPUs 118-1 . . . 118-n can be selected to keep the system power requirements at or below maximum power $P_{max}$ while still pumping all the amplifiers 314-1 . . . 314-n and 316-1 . . . 316-n coupled to the dimensions of the optical fiber paths 310e and 310w. This allows replacement of non-SDM system amplifiers with SDM-system amplifiers to convert a non-SDM system to an SDM system and thereby increase system capacity without increasing system power consumption beyond the maximum power $P_{max}$.

Figure 4:
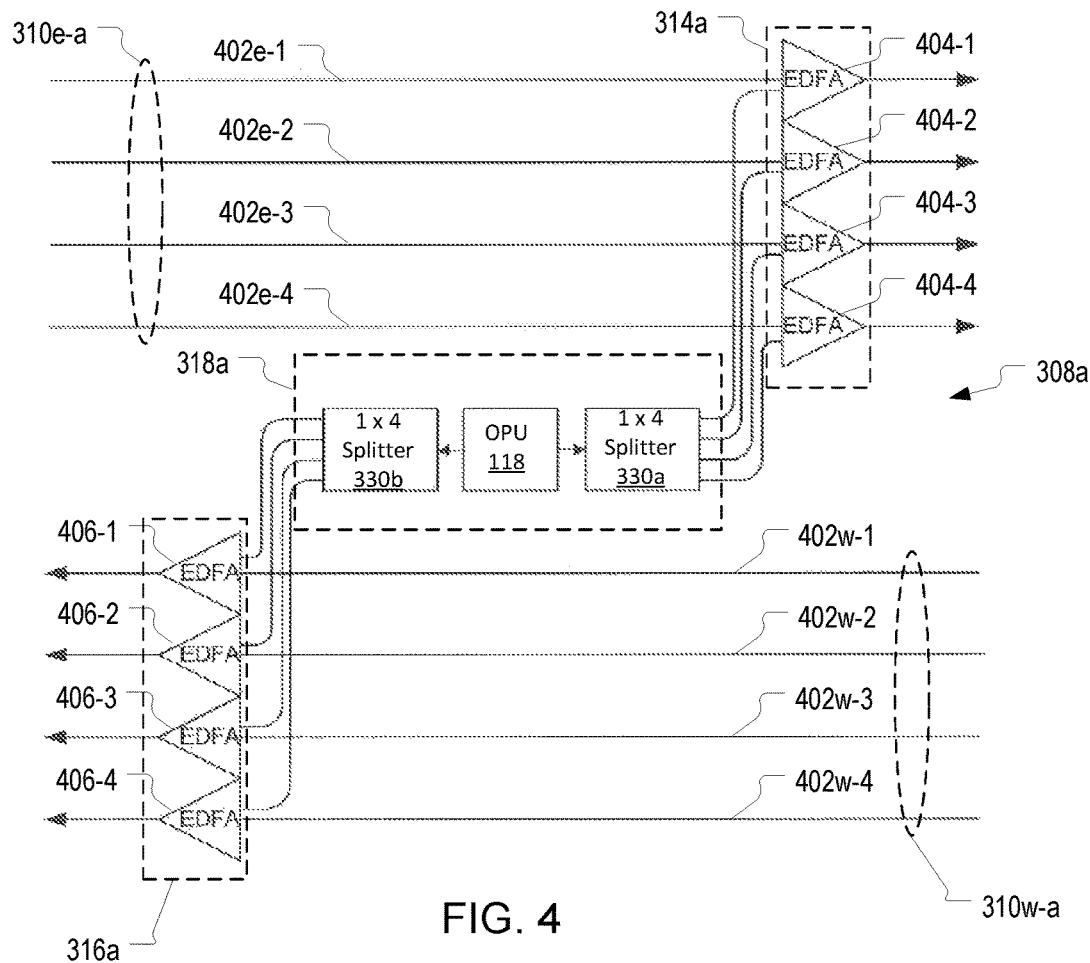
FIG. 4 is a block diagram of an example of an optical amplifier assembly consistent with the present disclosure.

One example of an optical amplifier assembly 318a consistent with the present disclosure is illustrated in FIG. 4. This illustrated embodiment shows a section of a first optical fiber path 310e-a and a section of a second optical fiber path 310w-a. The first 310e-a and second 310w-a optical fiber paths have four dimensions 402e-1 . . . 402e-4 and 402w-1 . . . 402w-4, respectively, for carrying each of the signals. The dimensions 402e-1 . . . 402e-4 and 402w-1 . . . 402w-4, may be established by different cores of a multi-core fiber, different modes of a multi-mode or few-mode fiber, different fibers in a bundle of single-mode, single core fibers, or combinations thereof. Although the illustrated embodiment includes fiber paths 310e-a and 310w-a each having four cores, those of ordinary skill in the art will recognize that a system and method consistent with the present disclosure may operate with fiber paths having any number of dimensions. Also, the fiber paths need not have the same number of dimensions.

The optical amplifier assembly 308a includes a first plurality of optical amplifiers 314a, a second plurality of optical amplifiers 316a and a pump assembly 318a. The first plurality of optical amplifiers 314a includes four EDFAs 404-1 . . . 404-4, each of which is coupled to a different associated one of the four dimensions 402e-1 . . . 402e-4 of the optical fiber path 310e-a. The second plurality of optical amplifiers 316a includes four EDFAs 406-1 . . . 406-4, each of which is coupled to a different associated one of the four dimensions 402w-1 . . . 402w-4 of the optical fiber path 310w-a.

The pump assembly 318a includes a known OPU 118 and first 330a and second 330b 1×4 splitters. The OPU 118 provides two separate pump outputs and includes multiple pumps coupled to the separate outputs to provide redundancy, as shown and described for example in connection with FIGS. 1 and 2. Each output of the OPU 118 is coupled to a different one of the 1×4 splitters 330a, 330b. The 1×4 splitters 330a, 330b may each take a known configuration for splitting the OPU 118 output received thereby onto four separate output paths. Each of the four separate paths at the output of the splitter 330a is coupled to an associated one of the EDFAs 404-1 . . . 404-4 for providing pump power to the EDFAs 404-1 . . . 404-4. Each of the four separate paths at the output of the splitter 330b is coupled to an associated one of the EDFAs 406-1 . . . 406-4 for providing pump power to the EDFAs 406-1 . . . 406-4.

With this configuration, the OPU 118 can pump the EDFAs 404-1 . . . 404-4 and 406-1 . . . 406-4 coupled to the first 310e-a and second 310w-a optical fiber paths, respectively, for amplifying signals propagating on the dimensions 402e-1 . . . 402e-4 and 402w-1 . . . 402w-4 using a number of pumps in the OPU 118 that is less than the sum of the number dimensions in the first 310e-a and second 310w-a optical fiber paths (i.e. eight in the illustrated example). If the OPU 118 is configured to include three pumps, as shown for example in FIG. 2, then the OPU 118 can pump the EDFAs 404-1 . . . 404-4 associated with each of the four dimensions in the first optical fiber path 310e-a and the EDFAs 406-1 . . . 406-4 associated with each of the four dimensions in the second optical fiber path 310w-a using a number (three) of pumps in the OPU 118 that is less than number of dimensions (i.e. four in the illustrated example) in the first 310e-a or second 310w-a optical fiber paths.

With reference again to FIG. 3, those of ordinary skill in the art will recognize that the splitter(s) 330 in a pump assembly 318 consistent with the present disclosure may be configured in a variety of ways depending on system requirements and constraints. For example, in embodiments consistent with the present disclosure different dimensions of the optical fiber path 310e and/or 310w may carry signals modulated according to different modulation formats. Some dimensions, for example, may carry signals modulated according to a quadrature phase shift keying (QPSK) format while other dimensions, even in the same optical fiber path, carry signals modulated according to a quadrature amplitude modulation (QAM) modulation format. To achieve the same propagation distance for different modulation formats on different dimensions, it may be necessary to provided different pump power to the amplifiers coupled to the dimensions. In embodiments consistent with the present disclosure, the splitters 330 may be configured to provide the required different pump power to amplifiers coupled to dimensions carrying signals with different modulation formats.

Figure 5:
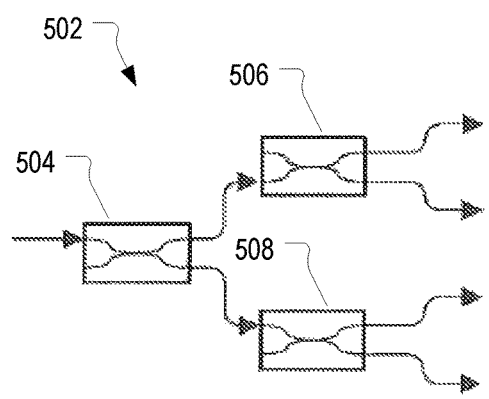
FIG. 5 is a block diagram of an example of a splitter consistent with the present disclosure.

The splitters 330 in an optical pump assembly 318 consistent with the present disclosure may be configured as coupler cascades. One example 502 of a splitter including a coupler cascade is illustrated in FIG. 5. The illustrated embodiment 502 is a 1×4 splitter including first 504 second 506 and third 508 1×2 couplers. The input to the splitter 502 is coupled to the first coupler 504 and the outputs of the first coupler 504 are coupled to the second 506 and third 508 couplers. The outputs of the second 506 and third 508 couplers are provided as the output of the splitter 502.

The splitting ratio of the couplers 504, 506, 508 may be selected to provide a desired power distribution ratio of the outputs of the splitter 502. To provide nominally equal distribution of power between the four outputs of the splitter 502, the splitting ratio of each of the couplers 504, 506, 508 may be 50/50. Use of splitting ratios for the couplers 504, 506, 508 other than 50/50 will result in an unequal power distribution between the four outputs of the splitter 502 to pump different dimensions with different pump powers, e.g. in an embodiment wherein different dimensions carry signals with different modulation formats.

In practice, the splitting ratio of couplers within a splitter, e.g. splitter 502, consistent with the present disclosure may not be equal to the nominal splitting ratio, resulting in the splitter providing an unequal power distribution between its outputs. As a result, the amplifiers within the first 314-1 . . . 314-n and second 316-1 . . . 316-n plurality of amplifiers will exhibit slightly different gain and tilt characteristics. To average out these gain deviations, the amplifiers within the first 314-1 . . . 314-n and second 316-1 . . . 316-n plurality of amplifiers may be operated under constant pump current or constant power control, or constant signal power control, and not under constant gain control or with tilt control. If additional adjustment of these gain deviations is desired, the adjustment may be achieved using offset splices when connecting the splitter outputs to the respective amplifiers within the first 314-1 . . . 314-n and second 316-1 . . . 316-n plurality of amplifiers so that the loss between the splitter and the amplifiers is adjusted.

In addition or alternatively, the outputs of one optical amplifier assembly 308-1 . . . 308-n can be matched to complementary inputs of a subsequent, e.g. next adjacent, optical amplifier assembly 308-1 . . . 308-n. For example, one of the first plurality of optical amplifiers 314-1 . . . 314-n of a first one of the optical amplifier assemblies 308-1 . . . 308-n may be pumped by its associated optical pump assembly 318-1 . . . 318-n to provide a high output power. The output of that amplifier may be coupled by the first optical path 310e to the input of one of the first plurality of optical amplifiers 314-1 . . . 314-n of a second one of the optical amplifier assemblies 308-1 . . . 308-n that is pumped by its associated pump assembly 318-1 . . . 318-n to provide a low output power that is lower than the high output power to assist in averaging overall performance.

Figure 6:
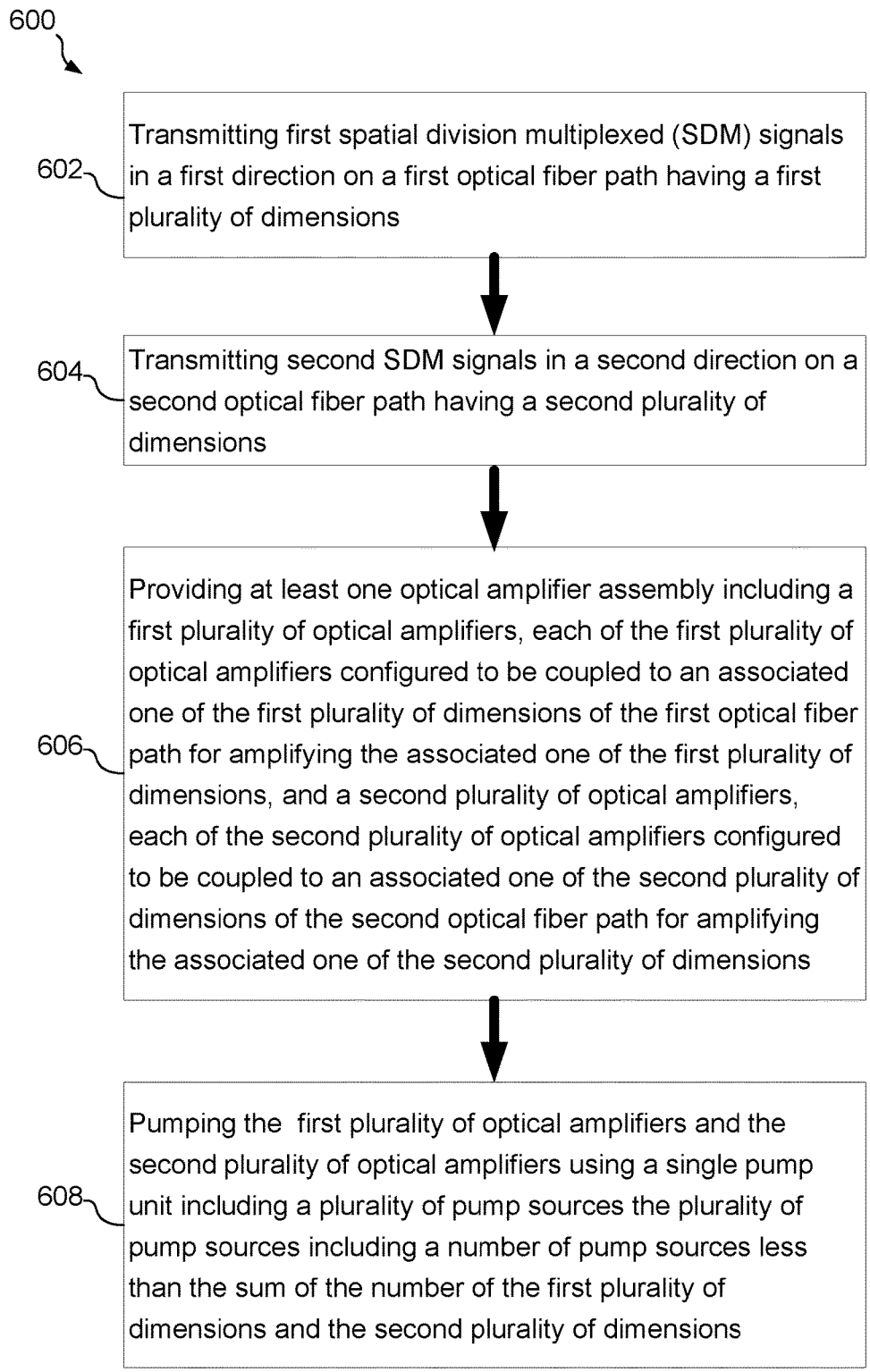
FIG. 6 is a flow chart illustrating an example of a method consistent with the present disclosure.

FIG. 6 is a flow chart illustrating a method 600 consistent with the present disclosure. Operation 602 includes transmitting first spatial division multiplexed (SDM) signals in a first direction on a first optical fiber path having a first plurality of dimension and operation 604 includes transmitting second SDM signals in a second direction on a second optical fiber path having a second plurality of dimensions. At least one optical amplifier assembly is provided 606 including a first plurality of optical amplifiers, each of the first plurality of optical amplifiers configured to be coupled to an associated one of the first plurality of dimensions of the first optical fiber path for amplifying the associated one of the first plurality of dimensions, and a second plurality of optical amplifiers, each of the second plurality of optical amplifiers configured to be coupled to an associated one of the second plurality of dimensions of the second optical fiber path for amplifying the associated one of the second plurality of dimensions. Operation 608 includes pumping the first plurality of optical amplifiers and the second plurality of optical amplifiers using a single pump unit including a plurality of pump sources the plurality of pump sources including a number of pump sources less than the sum of the number of the first plurality of dimensions and the second plurality of dimensions.

While FIG. 6 illustrates various operations according to an exemplary embodiment, it is fully contemplated herein that in other embodiments of the present disclosure, the operations depicted in FIG. 6 and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

According to one aspect there is thus provided an optical communication system including a first optical fiber path having a first plurality of dimensions, the first optical fiber path being configured carry first spatial division multiplexed (SDM) signals in a first direction; a second optical fiber path having a second plurality of dimensions, the second optical fiber path being configured carry second SDM signals in a second direction; and at least one optical amplifier assembly configured for amplifying the first and second SDM signals. The optical amplifier assembly includes a first plurality of optical amplifiers, each of the first plurality of optical amplifiers being coupled to an associated one of the first plurality of dimensions of the first optical fiber path for amplifying the associated one of the first plurality of dimensions, a second plurality of optical amplifiers, each of the second plurality of optical amplifiers being coupled to an associated one of the second plurality of dimensions of the second optical fiber path for amplifying the associated one of the second plurality of dimensions, and an optical pump assembly configured for pumping the first plurality of optical amplifiers and the second plurality of optical amplifiers. The optical pump assembly includes an optical pump unit including a plurality of pump sources configured to provide at least a first pump output and a second pump output, each of the plurality of pump sources being coupled to both the first and second pump outputs to provide redundancy in the event of failure of one of the first and second pump sources, the plurality of pump sources including a number of pump sources less than the sum of the number of the first plurality of dimensions and the second plurality of dimensions, a first splitter configured to split the first pump output to each of the first plurality of optical amplifiers, and a second splitter configured to split the second pump output to each of the second plurality of optical amplifiers.

According to another aspect there is provided an optical amplifier assembly for a spatial division multiplexed (SDM) optical communication system including a first optical fiber path having a first plurality of dimensions, the first optical fiber path being configured carry first SDM signals in a first direction, and a second optical fiber path having a second plurality of dimensions, the second optical fiber path being configured carry second SDM signals in a second direction. The optical amplifier assembly includes a first plurality of optical amplifiers, each of the first plurality of optical amplifiers configured to be coupled to an associated one of the first plurality of dimensions of the first optical fiber path for amplifying the associated one of the first plurality of dimensions, a second plurality of optical amplifiers, each of the second plurality of optical amplifiers configured to be coupled to an associated one of the second plurality of dimensions of the second optical fiber path for amplifying the associated one of the second plurality of dimensions, and an optical pump assembly configured for pumping the first plurality of optical amplifiers and the second plurality of optical amplifiers. The optical pump assembly includes an optical pump unit including a plurality of pump sources configured to provide at least a first pump output and a second pump output, each of the plurality of pump sources being coupled to both the first and second pump outputs to provide redundancy in the event of failure of one of the first and second pump sources, the plurality of pump sources including a number of pump sources less than the sum of the number of the first plurality of dimensions and the second plurality of dimensions, a first splitter configured to split the first pump output to each of the first plurality of optical amplifiers, and a second splitter configured to split the second pump output to each of the second plurality of optical amplifiers.

According to another aspect there is provided a method including: transmitting first spatial division multiplexed (SDM) signals in a first direction on a first optical fiber path having a first plurality of dimensions; transmitting second SDM signals in a second direction on a second optical fiber path having a second plurality of dimensions; providing at least one optical amplifier assembly including a first plurality of optical amplifiers, each of the first plurality of optical amplifiers configured to be coupled to an associated one of the first plurality of dimensions of the first optical fiber path for amplifying the associated one of the first plurality of dimensions, and a second plurality of optical amplifiers, each of the second plurality of optical amplifiers configured to be coupled to an associated one of the second plurality of dimensions of the second optical fiber path for amplifying the associated one of the second plurality of dimensions; and pumping the first plurality of optical amplifiers and the second plurality of optical amplifiers using a single pump unit including a plurality of pump sources the plurality of pump sources including a number of pump sources less than the sum of the number of the first plurality of dimensions and the second plurality of dimensions.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection As used herein, use of the term "nominal" or "nominally" when referring to an amount means a designated or theoretical amount that may vary from the actual amount.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An optical communication system comprising:
a first optical fiber path having a first plurality of dimensions, the first optical fiber path being configured carry first spatial division multiplexed (SDM) signals in a first direction;
a second optical fiber path having a second plurality of dimensions, the second optical fiber path being configured carry second SDM signals in a second direction; and
at least one optical amplifier assembly configured for amplifying the first and second SDM signals, the at least one optical amplifier assembly comprising
a first plurality of optical amplifiers, each of the first plurality of optical amplifiers being coupled to an associated one of the first plurality of dimensions of the first optical fiber path for amplifying the associated one of the first plurality of dimensions,
a second plurality of optical amplifiers, each of the second plurality of optical amplifiers being coupled to an associated one of the second plurality of dimensions of the second optical fiber path for amplifying the associated one of the second plurality of dimensions, and an optical pump assembly configured for pumping the first plurality of optical amplifiers and the second plurality of optical amplifiers, the optical pump assembly comprising:
an optical pump unit comprising a plurality of pump sources configured to provide at least a first pump output and a second pump output, each of the plurality of pump sources being coupled to both the first and second pump outputs to provide redundancy in the event of failure of one of the first and second pump sources, the plurality of pump sources comprising a number of pump sources less than the sum of the number of the first plurality of dimensions and the second plurality of dimensions,
a first splitter configured to split the first pump output to each of the first plurality of optical amplifiers, and
a second splitter configured to split the second pump output to each of the second plurality of optical amplifiers.

2. The optical communication system of claim 1 further comprising a spatial multiplexer configured to multiplex first modulated optical signals on the first plurality of dimensions, at least one of the first modulated optical signals being modulated with a different modulation format than at least one other of the first modulated optical signals.

3. The optical communication system of claim 2, wherein the first splitter is configured to split the first pump output to one of the first plurality of optical amplifiers associated with the at least one of the first modulated optical signals with a nominally different spitting ratio than at least one other of the first plurality of optical amplifiers.

4. The optical communication system of claim 1, said system comprising a plurality of the optical amplifier assemblies spaced along the first and second optical fiber paths, wherein one of the first plurality of optical amplifiers of a first one of the optical amplifier assemblies is configured to be pumped by an associated one of the optical pump assemblies to provide a high output power and the output the one of the first plurality of optical amplifiers of the first one of the optical amplifier assemblies is coupled by the first optical path to one of the first plurality of optical amplifiers of a second one of the optical amplifier assemblies configured to be pumped by an associated one of the optical pump assemblies to provide a low output power that is lower than the high output power.

5. The optical communication system of claim 1, wherein the first splitter is configured to split the first pump output to each of the first plurality of optical amplifiers with a nominally equal splitting ratio between the first plurality of optical amplifiers.

6. The optical communication system of claim 1, wherein the first splitter is configured to split the first pump output to each of the first plurality of optical amplifiers with a nominally different splitting ratio between the first plurality of optical amplifiers.

7. The optical communication system of claim 1, wherein the first optical fiber path comprises a first optical fiber having the first plurality of dimensions.

8. The optical communication system of claim 1, wherein the first optical fiber path comprises a first a plurality of optical fibers, each of the first plurality of optical fibers providing an associated on the first plurality of dimensions.

9. The optical communication system of claim 1, wherein the plurality of pump sources comprises a number of pump sources less than the number of the first plurality of dimensions or the second plurality of dimensions.

10. The optical communication system of claim 1, wherein the first plurality of dimensions is equal to the second plurality of dimensions.

11. An optical amplifier assembly for a spatial division multiplexed (SDM) optical communication system including a first optical fiber path having a first plurality of dimensions, the first optical fiber path being configured carry first SDM signals in a first direction, and a second optical fiber path having a second plurality of dimensions, the second optical fiber path being configured carry second SDM signals in a second direction, the optical amplifier assembly comprising:
a first plurality of optical amplifiers, each of the first plurality of optical amplifiers configured to be coupled to an associated one of the first plurality of dimensions of the first optical fiber path for amplifying the associated one of the first plurality of dimensions,
a second plurality of optical amplifiers, each of the second plurality of optical amplifiers configured to be coupled to an associated one of the second plurality of dimensions of the second optical fiber path for amplifying the associated one of the second plurality of dimensions, and
an optical pump assembly configured for pumping the first plurality of optical amplifiers and the second plurality of optical amplifiers, the optical pump assembly comprising:
an optical pump unit comprising a plurality of pump sources configured to provide at least a first pump output and a second pump output, each of the plurality of pump sources being coupled to both the first and second pump outputs to provide redundancy in the event of failure of one of the first and second pump sources, the plurality of pump sources comprising a number of pump sources less than the sum of the number of the first plurality of dimensions and the second plurality of dimensions,
a first splitter configured to split the first pump output to each of the first plurality of optical amplifiers, and
a second splitter configured to split the second pump output to each of the second plurality of optical amplifiers.

12. The optical amplifier of claim 11, wherein the first splitter is configured to split the first pump output to each of the first plurality of optical amplifiers with a nominally equal splitting ratio between the first plurality of optical amplifiers.

13. The optical amplifier of claim 11, wherein the first splitter is configured to split the first pump output to each of the first plurality of optical amplifiers with a nominally different splitting ratio between the first plurality of optical amplifiers.

14. The optical amplifier of claim 11, wherein the plurality of pump sources comprises a number of pump sources less than the number of the first plurality of dimensions or the second plurality of dimensions.

15. The optical amplifier of claim 11, wherein the first plurality of dimensions is equal to the second plurality of dimensions.

16. A method comprising:
transmitting first spatial division multiplexed (SDM) signals in a first direction on a first optical fiber path having a first plurality of dimensions;
transmitting second SDM signals in a second direction on a second optical fiber path having a second plurality of dimensions;

providing at least one optical amplifier assembly comprising a first plurality of optical amplifiers, each of the first plurality of optical amplifiers configured to be coupled to an associated one of the first plurality of dimensions of the first optical fiber path for amplifying the associated one of the first plurality of dimensions, and a second plurality of optical amplifiers, each of the second plurality of optical amplifiers configured to be coupled to an associated one of the second plurality of dimensions of the second optical fiber path for amplifying the associated one of the second plurality of dimensions; and pumping the first plurality of optical amplifiers and the second plurality of optical amplifiers using a single pump unit comprising a plurality of pump sources the plurality of pump sources comprising a number of pump sources less than the sum of the number of the first plurality of dimensions and the second plurality of dimensions;

wherein the single pump unit is configured to provide at least a first pump output and a second pump output each of the plurality of pump sources being coupled to both the first and second pump outputs to provide redundancy in the event of failure of one of the first and second pump sources, and wherein the single pump unit is provided in an optical pump assembly further comprising a first splitter configured to split the first pump output to each of the first plurality of optical amplifiers, and a second splitter configured to split the second pump output to each of the second plurality of optical amplifiers.

17. The method of claim 16 comprising modulating at least one of the first SDM signals with a different modulation format than at least one other of the first SDM signals.

18. The method of claim 16 comprising modulating at least one of the first SDM signals with a different modulation format than at least one other of the first SDM signals, wherein the first splitter is configured to split the first pump output to one of the first plurality of optical amplifiers associated with the at least one of the first SDM signals with a nominally different spitting ratio than at least one other of the first plurality of optical amplifiers.

19. The method of claim 16, comprising providing a plurality of the optical amplifier assemblies spaced along the first and second optical fiber paths;

pumping one of the first plurality of optical amplifiers of a first one of the optical amplifier assemblies to provide a high output power;

pumping one of the first plurality of optical amplifiers of a second one of the optical amplifier assemblies to provide a low output power that is lower than the high output power; and coupling the output the one of the first plurality of optical amplifiers of the first one of the optical amplifier assemblies to the input of the one of the first plurality of optical amplifiers of the second one of the optical amplifier assemblies.

20. A method comprising:

transmitting first spatial division multiplexed (SDM) signals in a first direction on a first optical fiber path having a first plurality of dimensions;

transmitting second SDM signals in a second direction on a second optical fiber path having a second plurality of dimensions;

providing at least one optical amplifier assembly comprising a first plurality of optical amplifiers, each of the first plurality of optical amplifiers configured to be coupled to an associated one of the first plurality of dimensions of the first optical fiber path for amplifying the associated one of the first plurality of dimensions, and a second plurality of optical amplifiers, each of the second plurality of optical amplifiers configured to be coupled to an associated one of the second plurality of dimensions of the second optical fiber path for amplifying the associated one of the second plurality of dimensions;

pumping the first plurality of optical amplifiers and the second plurality of optical amplifiers using a single pump unit comprising a plurality of pump sources the plurality of pump sources comprising a number of pump sources less than the sum of the number of the first plurality of dimensions and the second plurality of dimensions;

providing a plurality of the optical amplifier assemblies spaced along the first and second optical fiber paths;

pumping one of the first plurality of optical amplifiers of a first one of the optical amplifier assemblies to provide a high output power;

pumping one of the first plurality of optical amplifiers of a second one of the optical amplifier assemblies to provide a low output power that is lower than the high output power; and coupling the output the one of the first plurality of optical amplifiers of the first one of the optical amplifier assemblies to the input of the one of the first plurality of optical amplifiers of the second one of the optical amplifier assemblies.

21. The method of claim 20 comprising modulating at least one of the first SDM signals with a different modulation format than at least one other of the first SDM signals.

22. The method of claim 20, wherein the single pump unit is configured to provide at least a first pump output and a second pump output each of the plurality of pump sources being coupled to both the first and second pump outputs to provide redundancy in the event of failure of one of the first and second pump sources, and wherein the single pump unit is provided in an optical pump assembly further comprising a first splitter configured to split the first pump output to each of the first plurality of optical amplifiers, and a second splitter configured to split the second pump output to each of the second plurality of optical amplifiers, and wherein the method further comprises:

modulating at least one of the first SDM signals with a different modulation format than at least one other of the first SDM signals, wherein the first splitter is configured to split the first pump output to one of the first plurality of optical amplifiers associated with the at least one of the first SDM signals with a nominally different spitting ratio than at least one other of the first plurality of optical amplifiers.

* * * * *